United States Patent [19]

Becker et al.

[11] 4,394,900
[45] Jul. 26, 1983

[54] CENTRAL SYSTEM ELEVATOR

[75] Inventors: Roger T. Becker; John W. Hathaway; J. Michael Harbour, all of Kalamazoo, Mich.

[73] Assignee: Kalamazoo Conveyor Company, Kalamazoo, Mich.

[21] Appl. No.: 224,356

[22] Filed: Jan. 12, 1981

[51] Int. Cl.³ .................................. B65G 37/00
[52] U.S. Cl. ..................... 198/614; 198/621; 198/625; 198/741
[58] Field of Search .............. 198/604, 614, 608, 570, 198/741, 663, 669, 621, 625

[56] References Cited

U.S. PATENT DOCUMENTS

| | | | |
|---|---|---|---|
| 3,702,128 | 11/1972 | Trotter | 198/608 |
| 3,777,880 | 12/1973 | Becker et al. | 198/749 |
| 3,799,405 | 3/1974 | Wallace | 198/625 |
| 3,802,552 | 4/1974 | Gann | 198/741 |
| 3,828,920 | 8/1974 | Becker et al. | 198/741 |
| 3,841,908 | 10/1974 | Giersing | 198/625 |
| 4,052,311 | 10/1977 | Martin | 210/223 |
| 4,082,178 | 4/1978 | Van Nocker | 198/741 |
| 4,130,195 | 12/1978 | Becker et al. | 198/739 |
| 4,234,074 | 11/1980 | Martin | 198/558 |

Primary Examiner—Joseph E. Valenza
Assistant Examiner—Jonathan D. Holmes
Attorney, Agent, or Firm—Flynn, Thiel, Boutell & Tanis

[57] ABSTRACT

A conveyor apparatus for moving materials unidirectionally has an elongated, upwardly facing trough with at least one longitudinally extending semicylindrical recess in the bottom thereof. A helical flight is positioned in each such recess and is rotated about its longitudinal axis so as to move said materials along said trough. At least one rigid, elongated push-bar is supported in the trough for reciprocal lengthwise movement longitudinally of the trough. Each push-bar has a plurality of longitudinally spaced barbs and/or plows mounted thereon and shaped to advance said materials unidirectionally where the push-bar is reciprocated. Material retaining elements may also be provided on the walls of the trough to oppose movement of the said material in the opposite direction.

19 Claims, 8 Drawing Figures

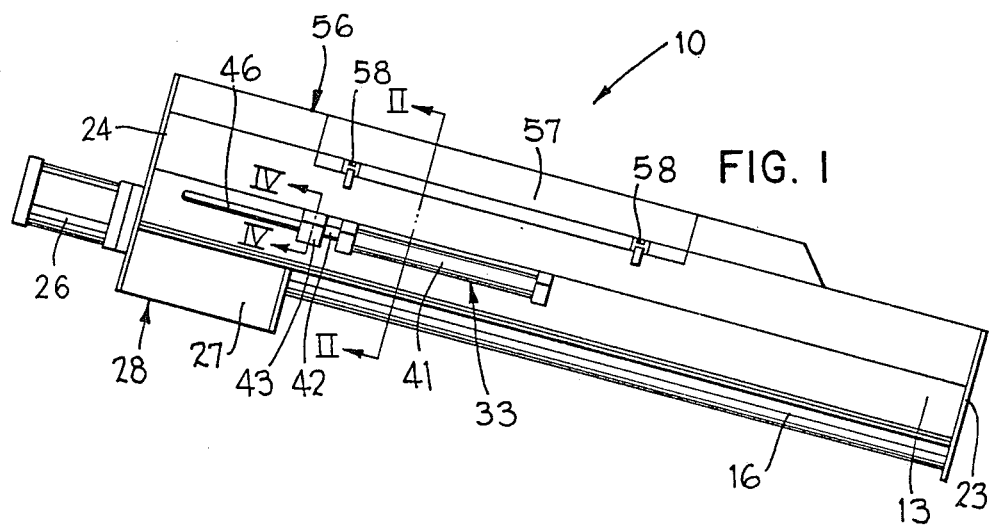
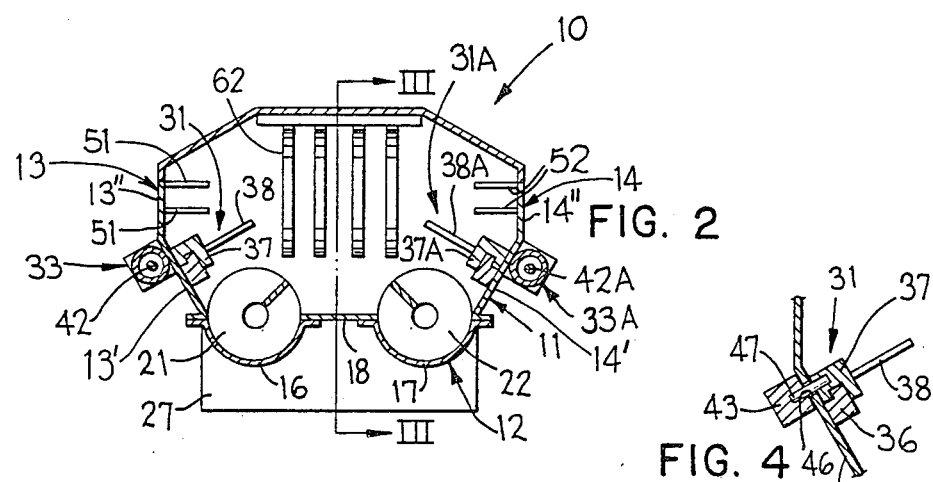
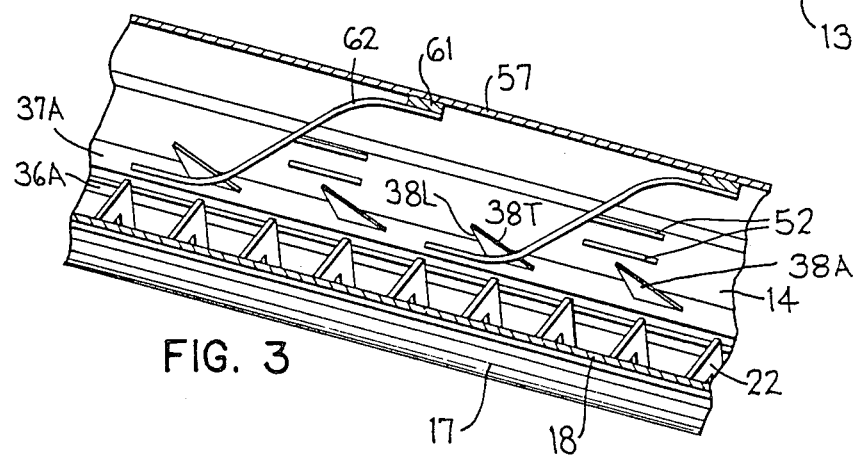

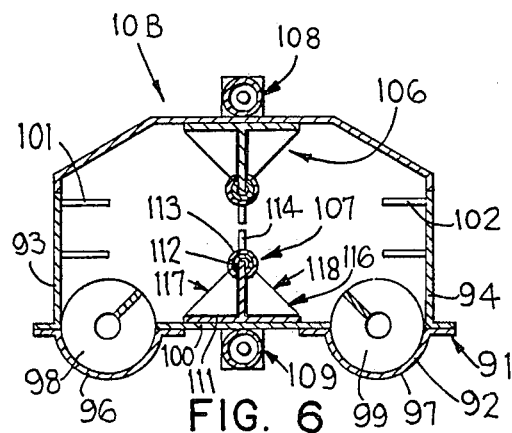
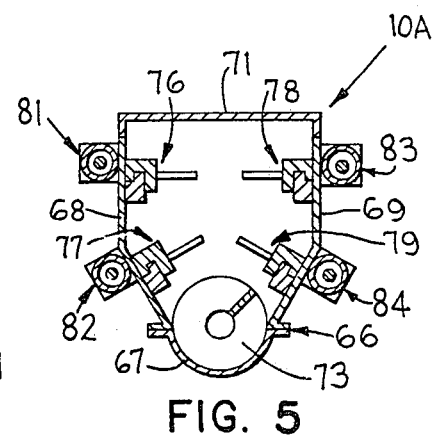
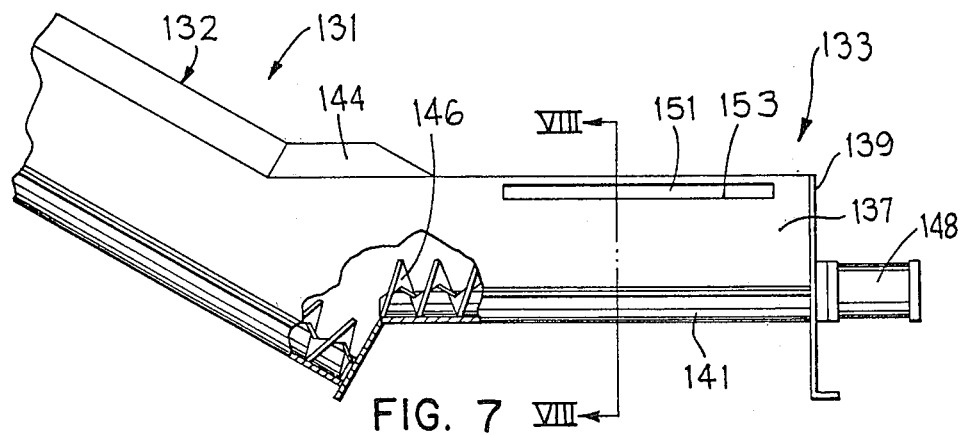
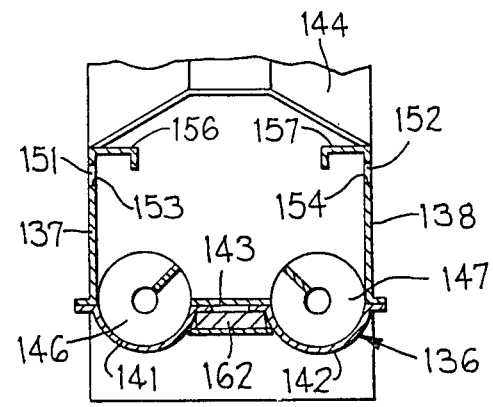

CENTRAL SYSTEM ELEVATOR

FIELD OF THE INVENTION

This invention relates in general to a materials conveyor and, more particularly, to a type thereof having an upwardly opening trough with at least one rotatable, helical flight and at least one reciprocable push-bar for unidirectionally advancing materials along the trough toward an outlet therefrom. More specifically, the invention concerns an elevating conveyor having substantially coextensive and parallel helical and push-bar devices for moving metallic chips unidirectionally upwardly away from a collecting location.

BACKGROUND OF THE INVENTION

Chip conveyors are experiencing widespread use in many industrial applications. In shops and factories utilizing various metal working machines, such as grinders, lathes and drill presses, chip conveyors have proved particularly useful in moving scrap metal away from the machine and into a receptacle. Frequently, the scrap materials must be conveyed to an elevated location. U.S. Pat. Nos. 3,777,880, 3,828,920 and 4,130,195, all of which are assigned to the assignee of the present application, have been designed for conveying waste materials.

The aforesaid patents disclose what is commonly known as a push-bar or harpoon conveyor, typically comprising a long trough having a plurality of interconnected plows supported therein for reciprocal movement. A power source is arranged to effect reciprocal movement of the entire train of plows within the trough, whereby the waste materials are urged unidirectionally along the trough. A plurality of retaining members or barbs on the side walls of the trough oppose movement of the waste materials in the opposite direction.

The general shape of the plows is such that on a forward stroke they engage the conveyed material and advance it toward one end of the trough, but on a rearward stroke they tend to slide past the conveyed material so that it does not move rearwardly significantly with respect to the trough. The retaining members cooperate on the rearward stroke to further prevent the conveyed material from moving in a rearward direction within the trough.

A problem with the prior art conveyors is that they are typically more efficient for larger chips and metal turnings than for smaller ones. This has been found to be particularly true when the trough is inclined, because such chips and turnings are often too small to be effectively engaged by the material-retaining elements on the walls of the trough. Also, the force of gravity tends to encourage the smaller chips and turnings to slide downwardly in the trough on the rearward stroke of the plow train.

U.S. Pat. No. 4,052,311 discloses a second type of scrap conveyor having an inclined trough with a semicylindrical bottom, an elongated helical flight rotationally supported in the trough, and a drive mechanism mounted to the upper end of the trough for effecting rotation of the flight. As the helical flight rotates, solids such as chips and metal cuttings are carried upwardly in the trough by the rotating helix.

Although conveyors of the type disclosed in U.S. Pat. No. 4,052,311 have fulfilled their intended purposes, they have not proved satisfactory in all respects. First, although such conveyors satisfactorily convey small chips and cuttings, the helical flights often jam when certain objects or large cuttings and turnings get into the trough.

Second, the helical drive mechanism must normally cooperate with the upper end of the helix when small chips and turnings are conveyed, because the small chips and cuttings tend to foul the bearings or other drive train elements necessary to connect the drive mechanism with the lower end of the helix. When the drive mechanism is connected to the upper end of the helix, however, the introduction of foreign objects or large chips and cuttings at the lower end of the helix creates torques in the helix which distort its shape.

Accordingly, an object of this invention is to provide an improved conveyor apparatus for efficiently conveying both small and large cuttings and turnings upwardly along a trough from one location to a second location at a higher elevation.

Another object of this invention is to provide a conveyor apparatus, as aforesaid, having a configuration which minimizes the possibility of jams which stop or slow the movement of the waste through the conveyor.

SUMMARY OF THE INVENTION

The objects and purposes of the invention, including those set forth above, are met by providing a conveyor apparatus comprising an upwardly opening trough having at least one longitudinally extending, semicylindrical recess in the lower portion thereof and having an elongated helical flight supported in each such recess for rotation about its longitudinal axis. A drive mechanism, preferably a hydraulic motor, is connected to each helix for effecting rotation of the helix in its recess. At least one longitudinally extending push-bar conveyor is provided in the trough, and comprises a rigid, elongated push-bar which is supported for reciprocal longitudinal movement in the trough and has a plurality of longitudinally spaced barbs mounted thereon. The barbs are adapted to engage the conveyed material on a forward stroke of the push-bar and advance it toward one end of the trough, but slide past the conveyed material on a rearward stroke of the push-bar so that the material is moved substantially unidirectionally along the trough. An actuator mechanism, preferably utilizing a hydraulic cylinder, is connected to each push-bar to effect the reciprocal movement thereof. A cover may be provided over the trough, and material-retaining barbs or fingers may be provided on the cover or walls of the trough, which barbs and fingers are shaped to interfere minimally with forward movement of the conveyed material in the trough but to inhibit rearward movement of the material. Push-bar mechanisms may be located on the bottom wall, the sidewalls, or the cover of the trough. The speed of the forward stroke of the push-bar mechanisms is preferably, but not necessarily, adjusted to be the same as the speed with which the helix conveys the waste material along the trough. Where two or more push-bar mechanisms are utilized, they may be synchronized so that their forward strokes occur simultaneously or preferably alternately.

BRIEF DESCRIPTION OF THE DRAWINGS

Other objects, purposes and advantages of the invention will be apparent to persons acquainted with apparatus of this general type upon reading the following specification and inspecting the accompanying drawings, in which:

FIG. 1 is a side view of one embodiment of a conveyor apparatus embodying the invention;

FIG. 2 is a sectional view taken along the line II—II of FIG. 1;

FIG. 3 is a fragmentary sectional view taken along the line III—III of FIG. 2;

FIG. 4 is a sectional view taken along the line IV—IV of FIG. 1;

FIG. 5 is a cross-sectional view, about as taken along the line II—II in FIG. 1 and illustrating a second embodiment of the conveyor apparatus;

FIG. 6 is a cross-sectional view, about as taken along the line II—II in FIG. 1 and showing a third embodiment of the conveyor apparatus;

FIG. 7 is a fragmentary side view, partially in section, of a fourth embodiment of the conveyor apparatus; and FIG. 8 is a sectional view taken along the line VIII—VIII of FIG. 7.

The words "up" and "down" will be used in the following description for convenience to designate directions in the drawings to which reference is made. The words "forward" and "rearward" will refer to the direction of material flow through the conveyor, "forward" being the normal flow direction. The words "in" and "out" will refer to directions toward and away from, respectively, the geometric center of the device and designated parts thereof. Such terminology will include derivatives of said words and words of similar import.

DETAILED DESCRIPTION

The conveyor 10 illustrated in FIGS. 1 and 2 includes an inclined trough 11 having a bottom wall 12 and spaced side walls 13 and 14 which are secured to and extend upwardly from the lateral edges of the bottom wall 12. The bottom wall 12 is defined by a pair of spaced, semicylindrical, upwardly facing recesses 16 and 17 extending parallel to each other. A shelf 18 extends between the adjacent edges of the recesses 16 and 17 throughout their lengths. The side walls 13–14, as illustrated by FIG. 2, have lower wall portions 13'–14' which project upwardly from the outer edges of the recesses 16–17, which wall portions 13'–14' are slightly outwardly sloped relative to the vertical.

Helical flights 21 and 22 are respectively disposed in the semicylindrical recesses 16 and 17 and are rotatable about their longitudinal axes. The flights 21 and 22 may be centerless or, if desired, may have a center shaft.

End plates 23 and 24 extend substantially perpendicular to the longitudinal axes of the flights 21 and 22 and are respectively mounted to the lower and upper ends of the trough 11.

A hydraulic motor 26 is mounted to the upper end plate 24 and is supplied with pressurized hydraulic fluid in a conventional manner by a hydraulic pump (not shown). The drive shaft of the motor 26 extends through the end plate 24 and is drivingly connected in a conventional manner to the upper end of the helical flight 21 for effecting rotation of the flight 21 in the semicylindrical portion 16 of the bottom wall 12. A discharge housing 27 is provided on the underside of the trough 11 at the upper end thereof and defines a discharge opening 28 through the bottom of the trough 11. Waste material conveyed forwardly up the trough 11 in a manner described in more detail hereinafter ultimately drops through the discharge opening 28 into a suitable receptacle (not illustrated).

Referring to FIG. 2, push-bar mechanisms 31 and 31A are respectively provided on the inside surfaces of the side walls 13 and 14 of the trough 11, and push-bar actuators 33 and 33A are mounted on the opposite, outer sides of said side walls 13 and 14 and aligned with the respective push-bar mechanisms 31 and 31A. The push-bar mechanisms 31 and 31A are mirror images of each other and, therefore, only the push-bar mechanism 31 on the side wall 13 is described in detail.

Referring to FIG. 4, the push-bar mechanism 31 includes an elongated rodlike L-shaped push-bar support 36 extending longitudinally in the trough 11, the end of one leg of the support 36 being secured to the lower portion 13' of side wall 13 and the other leg extending upwardly parallel to and spaced from the side wall. A rigid, elongated, U-shaped push-bar 37 is supported on the push-bar support 36 for longitudinal reciprocal movement in the trough 11. The legs of push-bar 37 extend downwardly on opposite sides of the upright leg of the push-bar support 36.

A plurality of longitudinally spaced planar barbs 38 are provided on the outer leg of the push-bar 37 and extend away from the side wall 13 substantially perpendicular thereto, whereby these barbs 38 hence project into the region directly above the flight 21. As best shown in FIG. 3, each barb 38 is substantially triangular in shape. It has one edge disposed against the push-bar 37, a leading edge 38L which is substantially perpendicular to the push-bar 37 and faces forwardly in the trough 11, and an inclined trailing edge 38T which faces rearwardly in the trough 11. The push-bar mechanism 31 is provided solely with the bars 38 so as to permit efficient upward advancing of larger cuttings.

Referring to FIG. 1, the actuator 33 on side wall 13 includes a longitudinally extending hydraulic cylinder 41 having a piston rod 42 coaxially received therein for reciprocal longitudinal movement. A drive block 43 is secured to the free end of the piston rod 42. The hydraulic cylinder 41 is connected in a conventional manner to a conventional source (not shown) of hydraulic fluid which effects the reciprocation of the piston rod 42 within the cylinder 41. A longitudinally extending slot 46 is provided through the side wall 13 adjacent the path of movement of the drive block 43. As shown in FIG. 4, a drive pin 47 extends through the slot 46 and is securely mounted in openings provided in the drive block 43 and in the push-bar 37.

Material-retaining barbs 51 and 52 are respectively provided on the upper side wall portions 13" and 14" and extend inwardly into the trough 11 substantially perpendicular to the side walls. The barbs 51 and 52 preferably have a triangular shape, similar to that of the barbs 38, with one edge against the respective side wall, a leading edge which is substantially perpendicular to the associated side wall and faces forwardly in the trough 11, and a trailing edge which is inclined with respect to the associated side wall and faces rearwardly in the trough 11.

The trough 11 includes a cover 56 which extends between, and is supported on, the side walls 13 and 14, except at the lower end of the trough 11. A portion 57 of the cover 56 is removable to provide access to the upper portion of the trough 11, and is held in place in any convenient manner, such as by latches 58.

As shown in FIGS. 2 and 3, a plurality of transversely extending finger support bars 61 are mounted in any convenient manner to the underside of the cover 56 at longitudinally spaced intervals therealong, and a plurality of material-retaining spring plates or fingers 62 are provided on each finger support bar 61. Each spring finger 62 is flexible and approximately S-shaped, the free end thereof extending forwardly and downwardly in the trough 11 to urge the conveyed materials toward the bottom of the trough. As indicated by FIG. 2, the retaining fingers or plates 62 project downwardly into the region between the push-bar mechanisms 31-31A, whereby the lower free ends of fingers 62 are normally positioned in close proximity to the upper edge of the flights 21-22. These fingers 62 thus hold the cuttings down in the lower part of the trough.

FIG. 5 illustrates an alternate conveyor apparatus 10A, which includes a trough 66 having a bottom wall defined by a single upwardly facing semicylindrical recess 67, side walls 68 and 69 secured to and extending upwardly from respective lateral edges of the recess 67, and a cover 71 which extends between the tops of the side walls 68 and 69.

A helical flight 73 is rotationally disposed in the semicylindrical recess 67. A drive mechanism similar to the motor 26 in FIG. 1, is drivingly connected to the helical flight 73 to effect rotation thereof about its longitudinal axis. A pair of push-bar mechanisms 76 and 77 are provided on the inner surface of the side wall 68 and a pair of push-bar mechanisms 78 and 79 are provided on the inner surface of the side wall 69. The opposed mechanisms 77 and 79 hence project into the region over the flight 73. Actuators 81, 82, 83 and 84 are respectively provided for the push-bar mechanisms 76, 77, 78 and 79, each actuator being mounted on the outer side of the respective side walls 68 or 69, adjacent its associated push-bar mechanism and aligned therewith. The construction and interconnection of the actuators 81-84 and the push-bar mechanisms 76-79 may be identical to that described hereinabove with respect to the embodiment of FIGS. 1-4.

FIG. 6 illustrates a third alternative embodiment 10B of the conveyor apparatus, including a trough 91 having a bottom wall 92, spaced side walls 93 and 94 secured to and extending upwardly from the outer lateral edges of the bottom wall 92, and a cover 95 extending between and supported on the tops of the side walls 93 and 94. The bottom wall 92 includes two spaced, upwardly facing, semicylindrical recesses 96 and 97, and a shelf 100 extending therebetween. Helical flights 98 and 99 are respectively disposed in the semicylindrical recesses 96 and 97 and are rotatable about their longitudinal axes. A driving mechanism (not shown) is drivingly connected to the flights 98 and 99 to effect the rotation thereof. A plurality of material-retaining barbs 101 and 102 are respectively provided on the side walls 93 and 94 and are similar in structure to the barbs 51 and 52 described above.

A push-bar mechanism 106 is mounted to the underside of the cover 95 and a push-bar mechanism 107 is mounted on the top of the shelf 100 of the bottom wall 92. Actuators 108 and 109 are respectively mounted on the upper side of the cover 95 and the underside of the shelf 100 in alignment with the push-bar mechanisms 106 and 107 for effecting reciprocal movement of the push-bar mechanisms 106 and 107.

The push-bar mechanisms 106 and 107 are of conventional construction, and are therefore described only briefly. Further, since the push-bar mechanisms 106 and 107 are identical, only the push-bar mechanism 107 is described.

The push-bar mechanism 107 includes an elongated push-bar support 111 having an inverted T-shape defined by two horizontally extending flanges which are mounted on the top surface of the shelf 100 and an upright flange secured to the horizontal flanges. A plurality of cylindrical bearings 112 are mounted to the top of the upright flange of the push-bar support 111 at longitudinally spaced intervals therealong so as to be coaxial with each other. An elongated, rigid, tubular push-bar 113 having a longitudinally extending slot in the bottom thereof is sleeved on the bearings 112 for reciprocal longitudinal movement in the trough 91 with the upright flange of the push-bar support 111 extending through the longitudinal slot of the push-bar 113. A plurality of upright, planar barbs 114 are mounted to the top of the push-bar 113 at longitudinally spaced intervals, and preferably have a triangular shape like that of the barbs 38 on the push-bar 37 of FIG. 3.

A plurality of wedge-shaped plows 116, each consisting of symmetric plow halves 117 and 118, are rigidly secured to the push-bar 113 at longitudinally spaced intervals, each plow 116 preferably being adjacent one of the upright barbs 114. The plow halves 117 and 118 lie on opposite sides of and are symmetric about the upright flange of the push-bar support 111. Each plow 116 is substantially wedge-shaped, with the surface at the wide end of the wedge facing forwardly in the trough 91 and substantially perpendicular to the axis of the push-bar 113. The remaining surfaces of the plow 116 converge rearwardly with respect to each other.

On the forward stroke of the push-bar 113, the forward facing walls of the plows 116 engage the conveyed material and move it forwardly in the trough 91. On a rearward stroke of the push-bar 113, the converging walls of the plow push the conveyed material laterally of the trough 91. Accordingly, a series of successive forward and rearward strokes of the push-bar 113 will act through the plows 116 to move the conveyed material unidirectionally and forwardly along the trough 91. A more detailed understanding of the construction and operation of the push-bar mechanisms 106 and 107 may be had by referring to U.S. Pat. No. 3,777,880 or No. 3,828,920.

The connections between the actuators 108 and 109 and their respective push-bar mechanisms 106 and 107 are analogous to the interconnections described above with respect to the actuators 32 and the push-bar mechanisms of FIG. 2 and are therefore not illustrated or described here in detail, aside from noting that the elongated slot for each drive pin must clearly be provided in the T-shaped support 111 as well as in the adjacent wall of the trough 91.

FIGS. 7 and 8 illustrate another alternate conveyor apparatus 131 having an inclined portion 132 and a tank 133 at the lower end thereof. The inclined portion 132 is preferably similar in structure to one of the conveyors discussed hereinabove with respect to FIGS. 1-6 and is therefore not described in detail.

The tank portion 133 comprises a bottom wall 136 (FIG. 8), upright side walls 137 and 138 attached at their lower edges to the lateral edges of the bottom wall 136, and a substantially vertical end wall 139 (FIG. 7) mounted to the ends of the bottom wall 136 and side walls 137 and 138. The bottom wall 136 includes spaced, upwardly facing and semicylindrical recesses 141 and 142, and a horizontal shelf therebetween. A tank cover 144 extends between and is supported on the tops of the side walls 138 and 139 adjacent the inclined portion 132 of the conveyor 131.

Helical flights 146 and 147 are respectively disposed in the semicylindrical recesses 141 and 142 and are rotatable about their longitudinal axes. Drive motors 148 are mounted to the end wall 139, and have drive shafts (not shown) which extend through openings in the end wall 139 and drivingly engage the flights 146 and 147 in a conventional manner to effect the rotation thereof.

Longitudinally extending openings 151 and 152 are respectively provided in the side walls 138 and 139 and have lower edges 153 and 154 which are substantially horizontal. Substantially horizontal flanges 156 and 157 are secured to and extend inwardly from the top edges of the side walls 138 and 139.

One or more optional magnets 162 may be provided beneath the shelf 143 in the bottom wall 136 of the tank 133 to facilitate the precipitation of certain metallic objects and their subsequent movement by the helical flights 146 and 147.

OPERATION

Although the operation of the mechanism described above will be apparent from the foregoing description by persons skilled in the art, a summary of such operation is now given for convenience.

Referring to FIGS. 1-4 and the preferred embodiment illustrated therein, material to be conveyed, such as chips, cuttings and turnings from machine tool operations, are deposited into the lower end of the trough 11. Pressurized hydraulic fluid is supplied to the hydraulic motors 26 in a conventional manner, whereby the motors 26 cause the helical flights 21 and 22 to rotate about their longitudinal axes in the semicylindrical recesses 16 and 17. Simultaneously, pressurized hydraulic fluid is supplied in a conventional manner to the hydraulic actuators 33 and 33A so that the piston rods 42 and 42A thereof move axially in and out of the cylinders 41 in a reciprocal manner. Preferably, the cylinders 41 are synchronized so that the forward strokes of the push-bar mechanisms 31A and 31B occur simultaneously or alternately. The resulting reciprocal movement of the drive block 43 at the end of the piston 42 (for example) acts through the drive pin 47 extending through the slot 46 to longitudinally reciprocate the push-bar 37 of the push-bar mechanism 31 on the L-shaped push-bar support 36. The push-bar mechanism 31A is reciprocated in a similar manner.

The smaller pieces of the conveyed material drop into the semicylindrical recesses 16 and 17 and are conveyed up the trough 11 by the rotating helical flights 21 and 22. Simultaneously, the leading edges 38L of the barbs 38 and 38A on the reciprocating push-bars 37 and 37A engage the larger pieces of the conveyed material on forward strokes of the push-bars 37 and 37A and shift it forwardly in the trough 11. The inclined edges 38T allow the barbs 38 and 38A to slide past the conveyed material on rearward strokes of the push-bars 37 and 37A so that the conveyed material does not move significantly rearwardly with respect to the trough 11. The forward movement of the larger pieces of the conveyed material by the push-bar mechanisms 31 and 31A is facilitated by the material retaining barbs 51 and 52 and by the spring fingers 62 which extend downwardly and forwardly from the cover 56 and tend to urge the solids against the push-bars and the helixes. The flexibility and S-shape of the spring fingers 62 allows the forwardly moving conveyed material to deflect the free ends of the spring fingers 62 upwardly and pass therebelow. The forwardly extending free ends of the spring fingers 62 will engage any conveyed material which is beginning to move rearwardly in the trough 11 and inhibit such rearward movement. Similarly, the inclined edges of the material-retaining barbs 51 and 52 allow the conveyed material to slide forwardly past the barbs 51 and 52, but the forwardly facing edges of the barbs 51 and 52 prevent the conveyed material from shifting rearwardly in the trough 11, as the push-bars are moved rearwardly.

Thus, the rotating helical flights 21 and 22 and the reciprocating push-bar mechanisms 31 and 31A will cooperate to convey both large and small pieces of the conveyed material to the upper end of the trough 11, whereby the material will drop through the discharge opening 28 into a suitable receptacle.

The operation of the embodiments of FIGS. 5 and 6 is similar to the operation of the embodiment of FIGS. 1-4.

Referring to the embodiment of FIGS. 7 and 8, material to be conveyed, such as metal cuttings and turnings, is deposited into the tank 133 through the opening between the flanges 156 and 157. Typically, cutting oil or a similar liquid will also be deposited in the tank with the material to be conveyed and the tank will generally be filled with such liquid to the level of the horizontal edges 153 and 154 of the respective openings 151 and 152 in the side walls 13 and 14. The liquid deposited in the tank 133 will overflow the edges 153 and 154 in a shallow stream along the length of the edges 153 and 154, which stream is sufficiently shallow to preclude substantially all of the chips and cuttings from being carried out of the tank 133 by the flow of the liquid over the edges 153 and 154. The liquid flowing over the edges 153 and 154 will be collected in a conventional manner by means (not shown) located below the edges 153 and 154, and will be returned to the sump of the machine tool for recirculation.

Chips, cuttings and other solid material deposited in the tank 133 will be conveyed horizontally through the tank 133 by the rotating helixes 146 and 147, and thence into the lower end of the inclined portion 132 of the conveyor 131. The operation of the inclined portion 132 is preferably substantially identical to the operation of the embodiments described hereinabove with respect to FIGS. 1-6.

Although four embodiments of the invention have been disclosed in detail for illustrative purposes, it will be recognized that variations or modifications of the disclosed apparatus, including the rearrangement of parts, lie within the scope of the present invention. In particular, although the conveyors disclosed herein are designed primarily for use in conveying waste material from a first location to a second location elevated thereabove and are therefore described and illustrated in inclined positions, it will be recognized that such conveyors may also be efficiently utilized to convey waste material horizontally from location to location. Thus, for example, it would be within the scope of the present invention to provide a push-bar mechanism in FIG. 8 on the shelf 143 of the bottom wall 136 between the horizontally extending helical flights 146 and 147.

The embodiments of the invention in which an exclusive property or privilege is claimed are defined as follows:

1. An elongated inclined conveyor apparatus for advancing and elevating solid materials, such as a mixture of large and small material pieces, for example fine and large metal chips and turnings, in a lengthwise direction along the conveyor apparatus, comprising:

elongated trough means disposed so as to incline upwardly relative to the horizontal, said trough means having a lower end for receiving therein said materials and an upper end for discharge of said materials, said trough means having wall means defining a generally channel-shaped trough having a bottom wall and a pair of generally upwardly projecting side walls, said bottom wall having means defining a substantially semicylindrical recess which opens upwardly and extends lengthwise along the trough;

first conveyor means movably disposed within and extending lengthwise of said trough for moving small materials upwardly along the trough, said first conveyor means including elongated helical flight means disposed in said recess means and being rotatable about the lengthwise axis;

first drive means operatively connected to said helical flight means for effecting rotation thereof in such direction as to cause the materials engaged by said flight means to be moved upwardly along said trough toward the upper end thereof;

second conveyor means movably disposed within and extending lengthwise along said trough for moving larger materials upwardly along said trough, said second conveyor means including first and second reciprocating conveyors extending lengthwise of said trough in parallel relationship with one another and supported for reciprocating lengthwise movement therein;

each of said first and second reciprocating conveyors including support means fixed to said wall means and defining an elongated path which extends in the lengthwise direction of said trough, an elongated support extending lengthwise of said trough and being guidably supported on said support means for linear reciprocal movement, and a plurality of material engaging elements mounted on said support at longitudinally spaced locations therealong, said material engaging elements having a configuration for engaging and advancing the materials upwardly along the trough during the forward stroke of the respective conveyor while permitting the material engaging elements to slidably move past the materials during the rearward stroke;

said material engaging elements as associated with each of said first and second reciprocating conveyors projecting generally into the interior of said trough, and said material engaging elements as associated with the respective first and second reiprocating conveyors being spaced laterally a substantial distance apart to permit the positioning of said materials therebetween; and second drive means drivingly connected to said first and second reciprocating conveyors for effecting linear reciprocation thereof in generally parallel relationship to the lengthwise direction of said trough.

2. A conveyor apparatus according to claim 1, wherein said first and second reciprocating conveyors are mounted adjacent the opposite side walls of the trough, and wherein the material engaging elements associated with said first and second reciprocating conveyors project into the region disposed above said helical flight means.

3. A conveyor apparatus according to claim 1, wherein said recess means includes first and second said recesses formed in sidewardly spaced relationship and extending lengthwise of said trough, said helical flight means including first and second helical flights respectively rotatably supported within said first and second recesses, said first and second reciprocating conveyors being reciprocably supported adjacent the opposite sides of said trough so that said first and second reciprocating conveyors are disposed more closely adjacent said first and second helical flights, respectively, the material engaging elements of the first and second reciprocating conveyors projecting into regions located directly above said first and second flights, respectively, whereby said material engaging elements of said first and second reciprocating conveyors are sidewardly spaced a substantial distance apart so as to leave a substantial central region therebetween for providing access directly therethrough to said first and second flights.

4. A conveyor apparatus according to claim 3, including a plurality of top hold-down structures positioned within said trough at longitudinally spaced intervals therealong for holding said materials in the bottom of said trough, said hold-down structure comprising elongated plate means secured adjacent one end thereof to said trough, said plate means projecting downwardly from said one end so that the other end of said plate means projects into the central region between said first and second reciprocating conveyors so as to be disposed closely adjacent said flights, said plate means projecting from said one end thereof in the upstream direction of said trough so that said other end of said plate means can be moved upwardly away from said flights to permit passage of materials upwardly along said trough.

5. A conveyor apparatus according to claim 4, wherein said trough includes a top wall which is spaced upwardly from the bottom wall and extends between said side walls, said plate means having said one end thereof mounted to said top wall so that said plate means projects downwardly in a cantilevered fashion in said upstream direction.

6. A conveyor apparatus according to claim 3, wherein the material advancing elements associated with each of said first and second recipocating conveyors consists solely of thin platelike barbs which are mounted on and project outwardly from said support into the interior of said trough.

7. A conveyor apparatus according to claim 6, wherein said first drive means causes the fine materials to be linearly advanced upwardly along the trough at substantially the same linear speed as the first and second reciprocating conveyors during their forward strokes, and wherein said second drive means causes said first and second reciprocating conveyors to operate in an out-of-phase relationship so that each said reciprocating conveyor advances while the other said reciprocating conveyor retracts.

8. A conveyor apparatus according to claim 3, wherein said bottom wall has said recesses associated therewith adjacent the opposite longitudinal edges thereof, and wherein each said side wall projects upwardly in close proximity to the outer edge of a respective said recess, each said side wall including at least a lower side wall portion which slopes upwardly and outwardly relative to the adjacent said recess, said first and second reciprocating conveyors being mounted on the sloped lower side wall portions, the material engaging elements on said first and second reciprocating conveyors comprising thin platelike barbs which project into the interior of said trough in substantially perpendicular relationship to the respective lower side wall portion, said material engaging elements of said first and second reciprocating conveyors projecting generally inwardly toward one another and being sloped upwardly so that said barbs project generally toward the center interior region of said trough, the barbs on said first and second reciprocating conveyors having the free ends thereof positioned upwardly from and approximately vertically over the respective first and second flights.

9. A conveyor apparatus according to claim 8, including one-way material retaining members fixed to the side walls at locations disposed above said reciprocating conveyors for preventing rearward movement of materials downwardly along said trough, said material retaining members projecting sidewardly into the interior of said trough through a small extent.

10. A conveyor apparatus according to claim 8, including a plurality of top hold-down structures positioned within said trough at longitudinally spaced intervals therealong for holding said materials in the bottom of said trough, said hold-down structure comprising elongated plate means secured adjacent one end thereof to said trough, said plate means projecting downwardly from said one end so that the other end of said plate means projects into the central region between said first and second reciprocating conveyors so as to be disposed closely adjacent said flights, said plate means projecting from said one end thereof in the upstream direction of said trough so that said other end of said plate means can be deflected upwardly away from said flights to permit passage of materials upwardly along said trough.

11. A conveyor apparatus according to claim 3, including one-way material retaining members fixed to the side walls at locations disposed above said reciprocating conveyors for preventing rearward movement of materials downwardly along said trough, said material retaining members projecting sidewardly into the interior of said trough through a small extent.

12. A conveyor apparatus according to claim 3, wherein said trough includes a top wall which is spaced upwardly from the bottom wall and extends between said side walls, said first reciprocating conveyor being mounted on said bottom wall between said first and second flights so that the material engaging elements thereof project upwardly, said second reciprocating conveyor being mounted on said top wall in substantially vertically opposed relationship to said first reciprocating conveyor, the material engaging elements of said second reciprocating conveyor projecting downwardly toward but being vertically spaced upwardly from the material engaging elements of said first reciprocating conveyor.

13. A conveyor apparatus according to claim 2, including one-way material retaining members fixed to the opposed side walls and projecting inwardly through a limited extent in opposed relationship to one another.

14. An elongated conveyor apparatus for advancing solid materials, such as a mixture of large and small material pieces, for example fine and large metal chips and turnings, in a lengthwise direction along the conveyor apparatus, comprising:

elongated trough means having an inlet at one end thereof for receiving said materials and an outlet at the other end thereof for discharge of said materials, said trough means having wall means defining a generally channel-shaped trough having a bottom wall and first and second side walls projecting upwardly from adjacent opposite edges of said bottom wall, said bottom wall having means defining first and second substantially semi-cylindrical recesses which open upwardly and extend lengthwise along said trough, said first and second recesses extending substantially parallel with one another and being sidewardly spaced apart so as to be disposed adjacent the opposite longitudinal edges of said bottom wall;

first conveyor means movably disposed within and extending lengthwise along said trough for moving small materials unidirectionally lengthwise thereof from said inlet toward said outlet, said first conveyor means including first and second elongated helical flights respectively disposed in said first and second recesses and being rotatable about their respective lengthwise axes;

first drive means operatively connected to said helical flights for effecting rotation thereof in such direction as to cause the materials engaged by said flights to be moved unidirectionally along said trough toward said outlet;

second conveyor means movably disposed within and extending lengthwise along said trough for unidirectionally moving larger materials lengthwise along said trough from said inlet toward said outlet, said second conveyor means including first and second reciprocating conveyors extending lengthwise of said trough and extending in parallel relationship with one another and supported for reciprocating lengthwise movement therein, said first and second reciprocating conveyors being respectively reciprocably supported on said first and second side walls;

each of said first and second reciprocating conveyors including an elongated reciprocal support which extends lengthwise of the trough and is supported for reciprocating movement relative thereto, each of said first and second reciprocating conveyors also including a plurality of material engaging barbs fixed to the respective support at longitudinally spaced intervals therealong, said material engaging barbs projecting transversely from the respective support into the interior of said trough, the barbs associated with said first conveyor projecting into the region located substantially above said first helical flight, and the barbs associated with said second reciprocating conveyor projecting into the region located substantially above said second helical flight, the barbs on said first reciprocating conveyor being spaced sidewardly a substantial distance from the barbs on said second reciprocating conveyor so as to define a central region therebetween which provides access to said first and second helical flights, said material engaging barbs having a configuration for engaging and moving the materials forwardly along the trough during the forward stroke of the respective conveyor while permitting the material engaging barbs to slidably move past the materials during the rearward stroke; and second drive means drivingly connected to said first and second reciprocating conveyors for effecting linear reciprocation thereof in generally parallel relationship to the lengthwise direction of said trough.

15. A conveyor apparatus according to claim 14, wherein said supports as associated with said first and second reciprocating conveyors comprise elongated rodlike bars which are positioned within and extend lengthwise of said trough in close proximity to the respective side wall, and said barbs as associated with each said conveyor extending transversely from the respective support in a direction which projects away from the respective side wall towards the central interior region of said trough, said barbs comprising the sole structure associated with the reciprocating conveyors for engaging and advancing said materials.

16. A conveyor apparatus according to claim 15, wherein said barbs comprise thin platelike elements which are fixed to the respective support and project transversely therefrom.

17. A conveyor apparatus according to claim 15, including one-way material retaining elements fixed to said first and second side walls at locations disposed above the respective first and second reciprocating conveyors, said material retaining elements projecting inwardly from the respective side walls toward the interior region of said trough, said material retaining elements projecting into said trough through only a small extent.

18. A conveyor apparatus according to claim 15, including a plurality of top hold-down structures positioned within said trough at longitudinally spaced intervals therealong for holding said materials in the bottom of said trough, said hold-down structure comprising elongated plate means secured adjacent one end thereof to said trough, said plate means projecting downwardly from said one end so that the other end of said plate means projects into the central region of said trough between said first and second reciprocating conveyors so as to be disposed closely adjacent said flights, said plate means projecting from said one end thereof in the direction along said trough toward said outlet so that said other end of said plate means can be deflected upwardly away from said flights to permit passage of materials forwardly along said trough.

19. A conveyor apparatus according to claim 14, including a plurality of top hold-down structures positioned within said trough at longitudinally spaced intervals therealong for holding said materials in the bottom of said trough, said hold-down structure comprising elongated plate means secured adjacent one end thereof to said trough, said plate means projecting downwardly from said one end so that the other end of said plate means projects into the central region of said trough between said first and second reciprocating conveyors so as to be disposed closely adjacent said flights, said plate means projecting from said one end thereof in the direction along said trough toward said outlet so that said other end of said plate means can be deflected upwardly away from said flights to permit passage of materials forwardly along said trough.

* * * * *